3,146,238
PROCESS OF PREPARING PYRIDINE CARBOXYLIC ACID AND ORGANIC NITRILES BY METATHESIS BETWEEN PYRIDINE NITRILES AND ORGANIC CARBOXYLIC ACIDS

John Pennington, Hull, and Bertram Yeomans, Preston, near Hull, England, assignors to The Distillers Company Limited, Edinburgh, Scotland, a British company
No Drawing. Filed July 5, 1962, Ser. No. 207,801
Claims priority, application Great Britain July 6, 1961
6 Claims. (Cl. 260—295)

The present invention relates to the simultaneous production of organic nitriles and of pyridine carboxylic acids.

In the application of the nitrile interchange reaction to nitriles of pyridine, while the organic nitriles produced may themselves be valuable products, it may be desirable to secure good yields of pyridine carboxylic acids simultaneously. Thus, for example, nicotinic acid may be obtained from 3-cyanopyridine and isonicotinic acids from 4-cyanopyridine.

According to the present invention, the process for the simultaneous production of an organic nitrile and of a pyridine carboxylic acid comprises heating a nitrile of pyridine with a carboxylic acid, removing a distillate containing the organic nitrile formed in the reaction, and recovering a pyridine carboxylic acid from the reaction mixture.

The pyridine nitrile is preferably heated with the carboxylic acid in the absence of a catalyst at a temperature within the range 200–240° C. and a temperature within the range 200–220° C. is particularly suitable. If desired minor amounts of acid catalysts may be used. The heating may suitably take place under reflux, and the boiling temperature may be adjusted, if necessary, by increasing or decreasing the pressure in the system. The removal of the organic nitrile formed as a distillate displaces the reaction equilibrium and allows additional quantities of product to be formed. The temperature at which the reaction takes place is important, in that at temperatures below 200° C. the reaction takes place rather slowly, and at temperatures above 240° C. decarboxylation of the pyridine carboxylic acids may take place.

Suitable pyridine nitriles include 3-cyanopyridine and 4-cyanopyridine. Suitable carboxylic acids include aromatic acids having or 7 carbon atoms such as benzoic acid and the toluic acids, and aliphatic acids having from 1 to 6 carbon atoms such as acetic, propionic, butyric, valeric and caproic acids. The reactants may be present initially in substantially equimolar proportions. Some increase in reaction rate may be obtained by increasing the proportion of the carboxylic acid, provided that the temperature of the reaction mixture can be maintained within the desired ranged.

If desired, the reaction may take place in the presence of an indifferent solvent.

The invention is further illustrated by the following examples.

Example 1

A mixture of 3-cyanopyridine (52 g., dry) and benzoic acid (61 g.) was heated under reflux. A distillate was removed from the column at a reflux ratio of 1:1 with a head temperature of 192° C. over a period of three hours. The distillate contained 80% by weight of benzonitrile, 15% by weight of 3-cyanopyridine, and some pyridine. The kettle product (63.1 g.) was recrystallised from water and washed with chloroform, and 49.1 grams of nicotinic acid (M. Pt. c. 221° C.) was obtained, corresponding to a yield of 90% based on the cyanopyridine consumed.

Example 2

104 grams of 4-cyanopyridine and 111 grams of propionic acid were heated as in Example 1 with 15 grams of sulphuric acid. This amount of propionic acid represented a 50% molar excess. A distillate was taken off over 30 hours at a head temperature of 100–120° C. The distillate contained 70% by weight of propionitrile, 15% by weight of an unidentified nitrile and some propionic acid. Distillation was continued at a head temperature of 140–145° C. to recover unconverted propionic acid (56.5 grams) leaving 130.9 grams of material in the kettle. One recrystallisation from water, with chloroform washing gave 98 grams of isonicotinic acid (M. Pt. 292–297° C.) representing a yield of about 80% based on the cyanopyridine consumed.

Example 3

A mixture of 3-cyanopyridine (101.5 g.) and n-butyric acid (88 g.) was heated under reflux and a distillate was removed from the column at a reflux ratio of ca. 10:1 over 13 hours at a head temperature of 115–122° C. During this period the kettle temperature rose from 197° to 251° C. The distillate (78 g.) comprised 76.8% w./w. of n-butyronitrile, 18.5% w./w. of pyridine, 1.6% w./w. of n-butyric acid and 2.8% w./w. of water. The n-butyronitrile recovered in the distillate corresponded to a yield of 89.2% based on the 3-cyanopyridine used. The pyridine recovered in the distillate corresponded to an 18.8% yield loss of nicotinic acid on 3-cyanopyridine due to decarboxylation.

Example 4

A mixture of 3-cyanopyridine (304 g.) and n-butyric acid (264 g.) was heated under reflux and a distillate was removed from the column at a reflux ratio of ca. 10:1 over 15 hours at a head temperature of 118–120° C. During this period further butyric acid (110 g.) was added to the kettle to keep the temperature at 215° C. The distillate (193 g.) comprised 97.9% w./w. of n-butyronitrile, 0.1% w./w. of pyridine, 0.78% w./w. of n-butyric acid and 1.22% of w./w. of water. The n-butyronitrile recovered in the distillate corresponded to a yield of 95.2% based on the 3-cyanopyridine used. The pyridine recovered in the distillate corresponded to an 0.05% yield loss of nicotinic acid on 3-cyanopyridine, due to decarboxylation. The kettle product (399 g.) was carbon treated and recrystallised from water and pure nicotinic acid (339.5 g.) was obtained in 94.7% yield on the 3-cyanopyridine used.

Example 5

A mixture of 3-cyanopyridine (101.5 g.) and acetic acid (60 g.) was heated under reflux and a distillate was removed intermittently from the column over a period of 46 hours at a head temperature of 78–85° C. During this period the kettle temperature rose from 155° to 219° C. The distillate (38.5 g.) comprised 89.6% w./w. of acetonitrile, 2.5% w./w. of acetic acid and 8.0% w./w. of water. The acetonitrile in the distillate corresponded to a yield of 86.4% based on the 3-cyanopyridine used. Purified nicotinic acid (110 g.) was isolated from the kettle product in 91.8% yield on the 3-cyanopyridine used.

Example 6

A mixture of 3-cyanopyridine (101.5 g.) and acetic acid (60 g.) was heated under reflux under a pressure of 40 lbs. sq. in. and a distillate was removed intermittently from the column over a period of 8 hours at a head temperature of 108.5–113° C. During this period the kettle temperature rose from 180° to 260° C. The distillate (42 g.). comprised 82.7% w./w. of acetonitrile, 3.7% w./w. of pyridine, 7.75% w./w. of acetic acid and 5.89% w./w. of water. The acetonitrile recovered in the distillate corresponded to a yield of 87% based on the 3-cyanopyridine used.

We claim:

1. Process for making organic nitrile and pyridine carboxylic acid comprising heating an admixture of pyridine nitrile and benzoic acid at a temperature between 200 and 240° C., removing distillate from said reaction admixture containing said organic nitrile, and recovering said pyridine, carboxylic acid from the residual reaction mixture.

2. Process for making organic nitrile and pyridine carboxylic acid comprising heating an admixture of pyridine nitrile and toluic acid at a temperature between 200 and 240° C., removing distillate from said reaction admixture containing said organic nitrile, and recovering said pyridine carboxylic acid from the residual reaction mixture.

3. Process for making organic nitrile and pyridine carboxylic acid comprising heating admixture of pyridine nitrile and a member selected from the gorup consisting of aliphatic acids of from 2 to 7 carbon atoms, benzoic acid and toluic acid at a temperature between 200 and 240° C., removing distillate from said reaction admixture containing said organic nitrile, and recovering said pyridine carboxylic acid from the residual reaction mixture.

4. Process for making organic nitrile and pyridine carboxylic acid comprising heating admixture of pyridine nitrile and aliphatic carboxylic acid of 2 to 7 carbon atoms at a temperature between 200 and 240° C., removing distillate from said reaction admixture containing said organic nitrile, and recovering said pyridine carboxylic acid from the residual reaction mixture.

5. The process as claimed in claim 3 in which the reaction takes place in the presence of a catalytic amount of an acid catalyst.

6. The process as claimed in claim 3 in which the reaction takes place under reflux with removal of the volatile nitrile product, and the temperature of boiling is controlled by adjusting the pressure in the system.

References Cited in the file of this patent

Whitmore: "Organic Chemistry," 2nd edition, page 415, van Nostrand (1951).

Zil'berman: "Zhur. Ob. Khim.," volume 29, pages 3350–5 (1959).

Fieser et al.: "Organic Chemistry," 3rd edition, pages 796, 806–10 (Reinhold) (1956).

Bernthesen et al.: "Organic Chemistry," 4th edition, pages 681–2 (Blackie) (1941).